US009001680B2

(12) United States Patent
Koskela et al.

(10) Patent No.: US 9,001,680 B2
(45) Date of Patent: Apr. 7, 2015

(54) METHOD AND APPARATUS FOR PROVIDING IMPROVED DETECTION OF OVERLAPPING NETWORKS

(75) Inventors: Timo K. Koskela, Oulu (FI); Anna Pantelidou, Oulu (FI); Samuli Turtinen, Ii (FI); Sami-Jukka Hakola, Kempele (FI)

(73) Assignee: Broadcom Corporation, Irvine, CA (US)

( * ) Notice: Subject to any disclaimer, the term of this patent is extended or adjusted under 35 U.S.C. 154(b) by 102 days.

(21) Appl. No.: 13/549,849

(22) Filed: Jul. 16, 2012

(65) Prior Publication Data

US 2014/0016478 A1 Jan. 16, 2014

(51) Int. Cl.
H04J 1/16 (2006.01)
H04W 48/16 (2009.01)
(52) U.S. Cl.
CPC ..................................... H04W 48/16 (2013.01)
(58) Field of Classification Search
CPC .. H04W 72/082; H04W 72/085; H04J 11/005
USPC ............ 370/241, 252; 455/39, 63.1, 63.4, 91, 455/114.2
See application file for complete search history.

(56) References Cited

U.S. PATENT DOCUMENTS

| 2002/0119782 | A1* | 8/2002 | Voyer ........................... 455/450 |
| 2008/0297401 | A1* | 12/2008 | Nishida ........................ 342/147 |
| 2009/0233554 | A1* | 9/2009 | Cordeiro et al. ............. 455/63.1 |
| 2012/0117401 | A1* | 5/2012 | Gobriel et al. ................ 713/320 |
| 2013/0140016 | A1* | 6/2013 | Storm et al. .................. 165/205 |

* cited by examiner

Primary Examiner — Un C Cho
Assistant Examiner — Siming Liu
(74) Attorney, Agent, or Firm — Oblon, McClelland, Maier & Neustadt, L.L.P.

(57) ABSTRACT

A method, apparatus and computer program product provide improved detection of overlapping wireless networks. In this regard, the method, apparatus and computer program product may utilize a processor, such as a processor on a wireless access point, to determine one or more parameters for a scan of a wireless network to identify overlapping networks. Wireless stations may utilize the parameters to determine the content of a scan report generated from a scan of the wireless network. The wireless stations may further utilize the parameters to determine which values should be monitored and/or recorded during the scan of the network. The wireless stations may respond to the access point with results corresponding to the parameters requested by the access point, and the access point may use the results to determine channel access parameters for other devices on the network, such as the wireless stations.

15 Claims, 8 Drawing Sheets

METHOD AND APPARATUS FOR PROVIDING IMPROVED DETECTION OF OVERLAPPING NETWORKS

TECHNOLOGICAL FIELD

An example embodiment of the present invention relates generally to wireless network protocols and, more particularly, to improved detection of overlapping networks.

BACKGROUND

As wireless networks have become less expensive and less complicated to implement, such networks have become increasingly common in home and work environments. While previous implementations of wireless network technology primarily focused on enabling computing platforms such as personal computers to communicate with one another, improvements in signal strength, network security, and device power usage have led to a variety of new applications for wireless technology. For example, household items such as appliances, utility meters, security systems, or heating and air conditioning systems may be network-enabled for communication with monitoring and management systems. Many of these devices may feature battery powered wireless network transmitters in order to eliminate the need for the transmitter to be coupled to a power distribution system (e.g., a wall outlet).

Although traditional wireless network protocols allow for devices to join a network and send and receive data, such protocols may not be ideal for devices that wish to minimize power consumption and maximize range. For example, in common wireless protocols such as 802.11g and 802.11n, devices that are members of a network are, in practice, always on if there is a data session ongoing, ready to send or receive data. Attempting to use such a networking protocol with a certain types of wireless devices, such as battery operated transmitters, transmitters which may have limited access to power supplies, or sensor devices or smart meters which may have operational lifetime of years, may quickly drain the battery, rendering the device inoperable.

Furthermore, as the transmission range of these networks increases, the likelihood of overlapping networks increases due to the increased area that may be covered by any given transmitter. In scenarios where multiple networks are present in the same frequency spectrum, several communications between an access point and a wireless station may be required to avoid contention of the channel and collisions of transmissions. These communications may be inefficient, and cause the wireless station to transmit and receive redundant and/or superfluous data in order to negotiate the channel selection process.

BRIEF SUMMARY

A method, apparatus and computer program product are therefore provided according to an example embodiment of the present invention in order to provide improved detection of overlapping wireless networks. In this regard, the method, apparatus and computer program product of an example embodiment may utilize a processor, such as a processor on a wireless access point, to determine one or more parameters for a scan of a wireless network to identify overlapping networks. These parameters may be communicated to one or more wireless stations communicating on the network and the wireless stations may utilize the parameters to determine the content of a scan report generated from a scan of the wireless network. The wireless stations may further utilize the parameters to determine which values should be monitored and/or recorded during the scan of the network. The wireless stations may respond to the access point with results corresponding to the parameters requested by the access point, and the access point may use the results to determine channel access parameters for other devices on the network, such as the wireless stations.

A configurable scan process as described may minimize transmission time and bandwidth of the wireless stations, thus conserving battery power. Furthermore, the configurable message may allow for the wireless access point to gather additional data that may result in modified channel access parameters that do not necessarily require a given device to change network channels. For example, the access point may reduce the access probability of particular devices or schedule gaps in the channel to avoid the need to move to another channel, which may be undesirable due to a large number of sleeping (e.g., undetected) devices that may also be present on the channel, thus requiring them to reacquire the network upon awaking from sleep.

Some example embodiments of the method may include determining, with a processor, one or more scan parameters for identifying the presence of an overlapping network, causing the one or more scan parameters to be transmitted to one or more wireless stations, receiving at least one scan report, determining a set of channel access parameters using the content of at least one scan report, and causing at least a portion of the set of channel access parameters to be transmitted to the one or more wireless stations to mitigate interference with at least one overlapping wireless network. The one or more scan parameters may be chosen from a subset of a plurality of scan parameters. The content of the scan report may be defined by the one or more scan parameters. Embodiments of the method may further include identifying the at least one overlapping wireless network from the at least one scan report, and defining the set of channel access parameters such that the set of channel access parameters instruct at the one or more of the wireless stations to avoid interference with the at last one overlapping wireless network.

In some embodiments of the method, the one or more scan parameters may be at least one access parameter selected from a group consisting of a location of at least one of the one or more wireless stations, a number of service set identifiers visible to the at least one of the one or more wireless stations, or an interference level. The one or more access parameters may define a frame subtype for indicating the presence of an overlapping network by using a particular frame type without transmission of additional data identifying the overlapping network. Some embodiments of the method may include identifying a plurality of the one or more wireless stations as having one or more common characteristics from the at least one scan report data, separating the plurality of the one or more wireless stations into a group, and determining common channel access parameters for each of the plurality of the one or more wireless stations in the group. The common characteristics may be at least one of a common location or a common interference level with a particular overlapping wireless network. The common characteristic may be a weighted average of all interferences. Some embodiments of the method may also include identifying, from the at least one scan report, one or more non-preferred access slots that are likely to cause interference with an overlapping network. The channel access parameters may notify the one or more wireless devices of the one or more non-preferred access slots. The one or more wireless stations may communicate via an 802.11 ah protocol.

Further embodiments of the method may include receiving one or more scan parameters indicating a set of network attributes for identifying the presence of overlapping wireless networks, generating a scan report, with a processor, and causing the scan report to be transmitted to an access point. The scan parameters may indicate a subset of a plurality of scan parameters. The scan report may include a set of scan results related to the set of network attributes identified by the one or more scan parameters. The method may further include causing a wireless network to be scanned to determine the set of scan results in response to receiving the one or more scan parameters. Embodiments of the method may also include receiving a set of channel access parameters from the access point in response to causing the scan report to be transmitted.

Embodiments of the apparatus may include at least one processor and at least one memory including computer program instructions. The at least one memory and the computer program instructions may be configured to, with the at least one processor, cause the apparatus at least to determine one or more scan parameters for identifying the presence of an overlapping network, cause the one or more scan parameters to be transmitted to one or more wireless stations, receive at least one scan report, determine a set of channel access parameters using the content of the at least one scan report, and cause at least a portion of the set of channel access parameters to be transmitted to the one or more wireless stations to mitigate interference with at least one overlapping wireless network. The one or more scan parameters may be chosen from a subset of a plurality of scan parameters. The content of the scan report may be defined by the one or more scan parameters. Embodiments of the apparatus may further include program instructions configured to cause the apparatus to identify the at least one overlapping wireless network from the at least one scan report, and define the set of channel access parameters such that the set of channel access parameters instruct at least the one or more of the wireless stations to avoid interference with the at last one overlapping wireless network. The one or more scan parameters may be at least one access parameter selected from a group consisting of a location of at least one of the one or more wireless stations, a number of service set identifiers visible to the at least one of the one or more wireless stations, or an interference level. The one or more access parameters may define a frame subtype for indicating the presence of an overlapping network by using a particular frame type without transmission of additional data identifying the overlapping network.

Embodiments of the apparatus may further include program instructions configured to cause the apparatus to identify a plurality of the one or more wireless stations as having one or more common characteristics from the at least one scan report data, separate the plurality of the one or more wireless stations into a group, and determine common channel access parameters for each of the plurality of the one or more wireless stations in the group. The common characteristics may be at least one of a common location or a common interference level with a particular overlapping wireless network. The common characteristic may be a weighted average of all interferences. Embodiments of the apparatus may further include program instructions configured to cause the apparatus to identify, from the at least one scan report, one or more non-preferred access slots that are likely to cause interference with an overlapping network. The channel access parameters may notify the one or more wireless devices of the one or more non-preferred access slots.

BRIEF DESCRIPTION OF THE DRAWINGS

Figure 1:
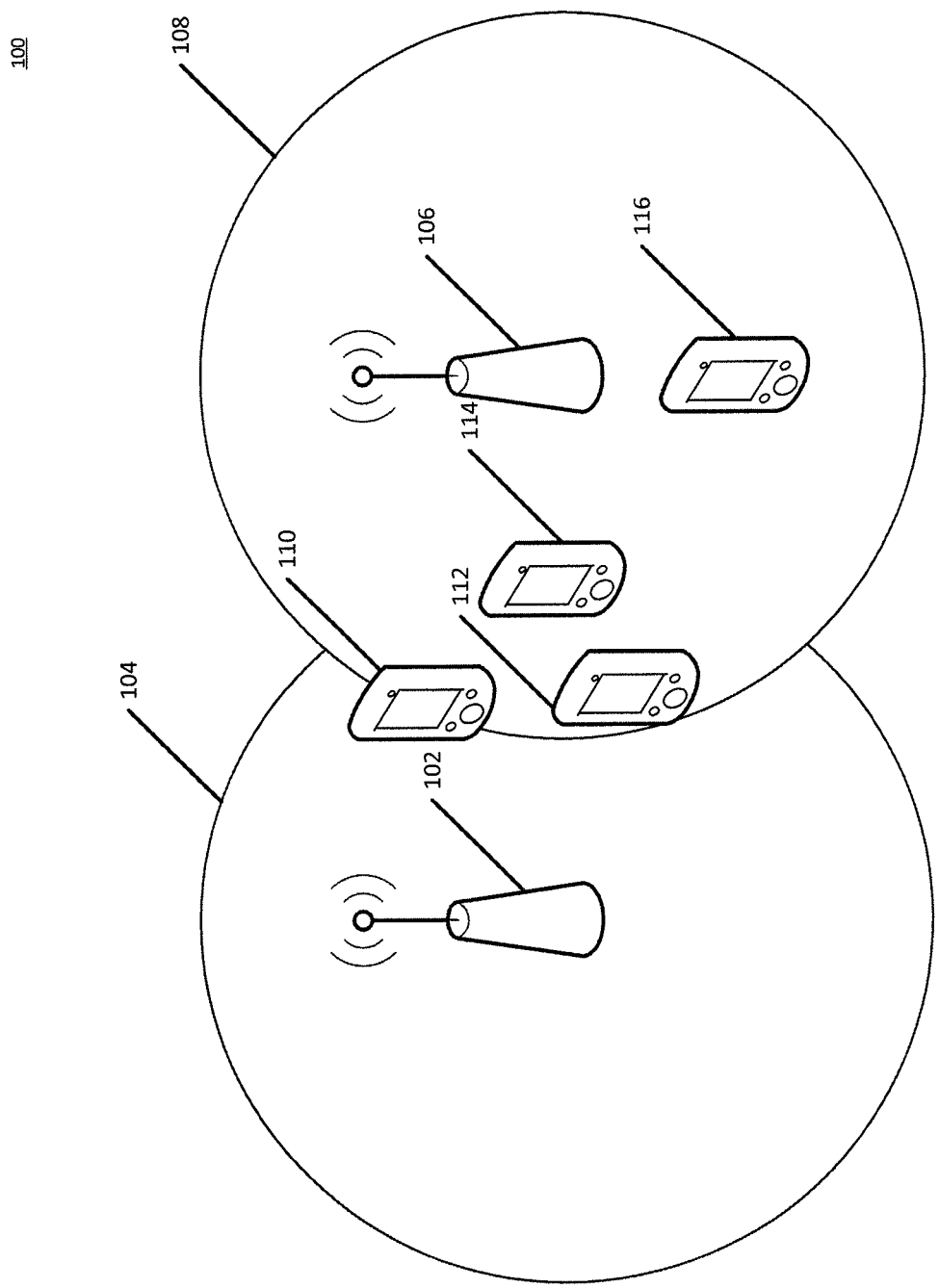
Figure 2:
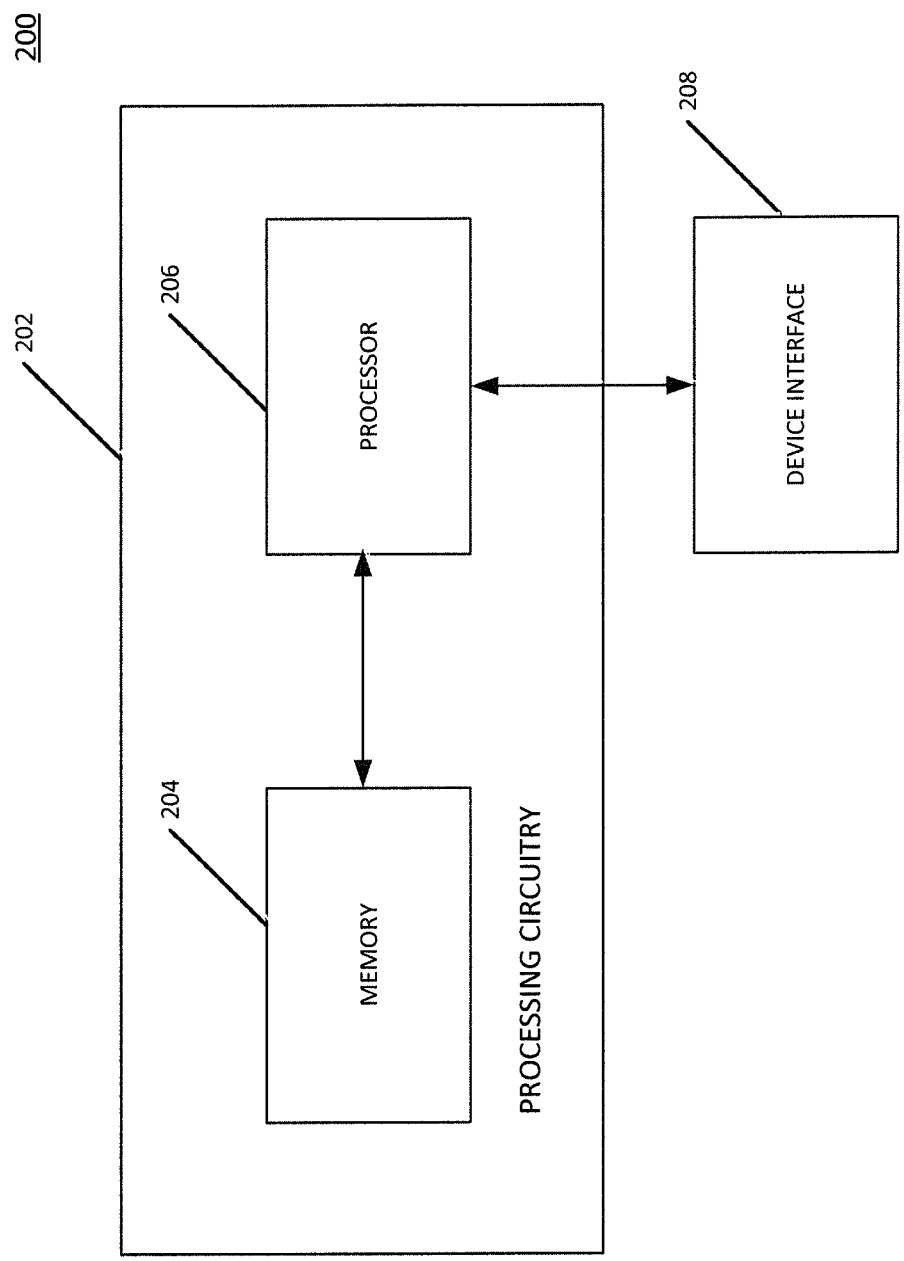
Figure 3:
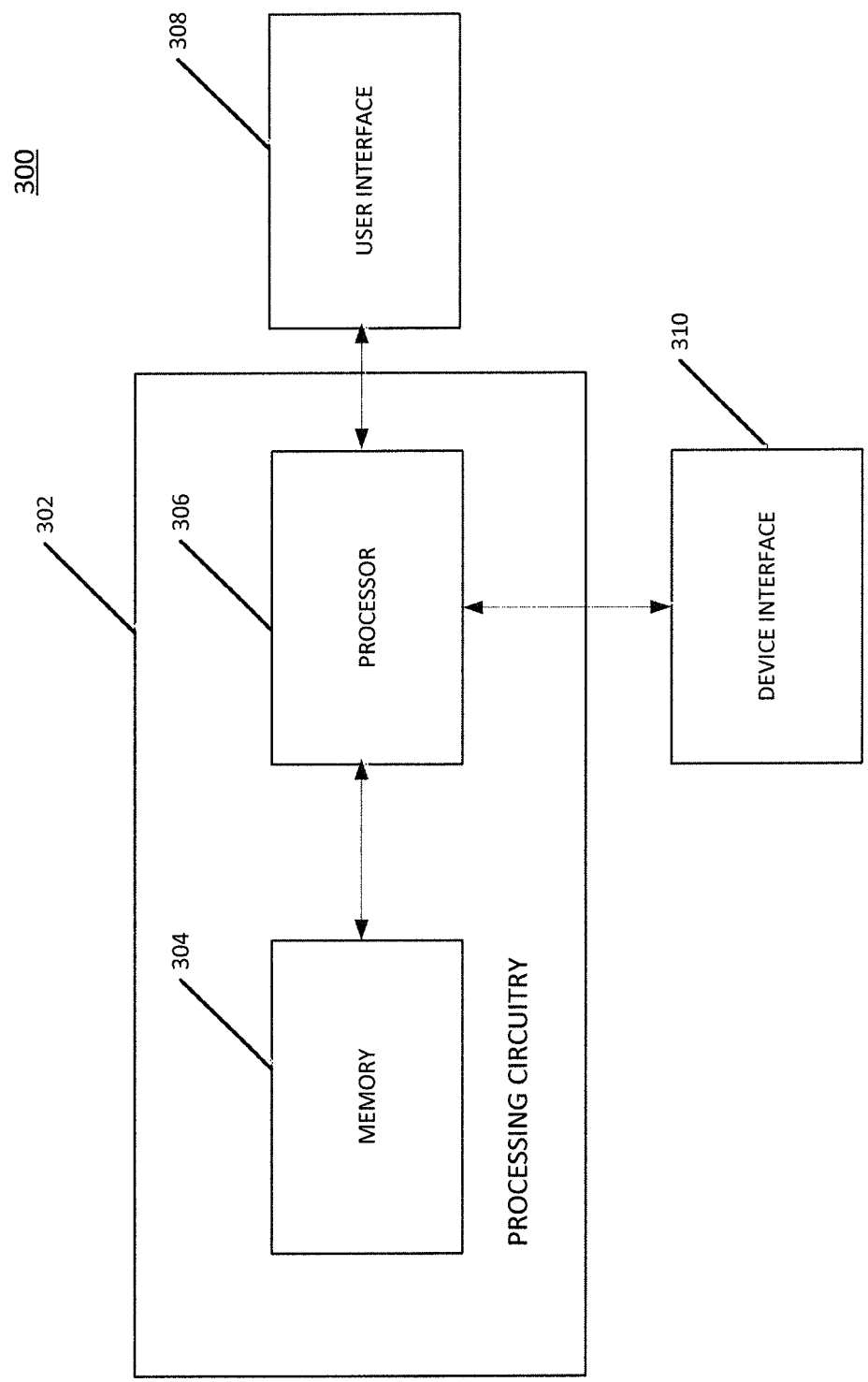
Figure 4:
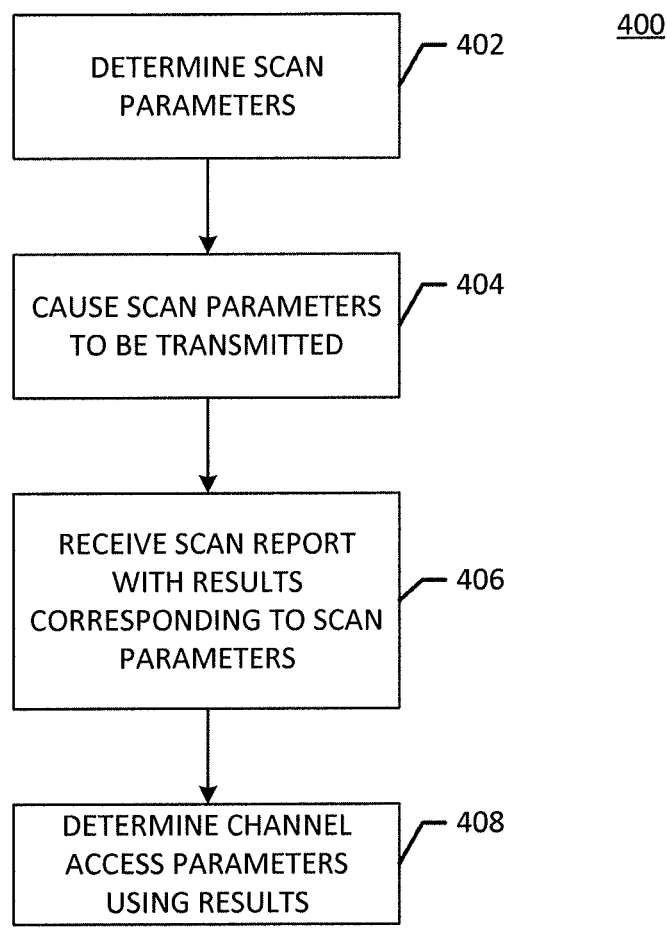
Figure 5:
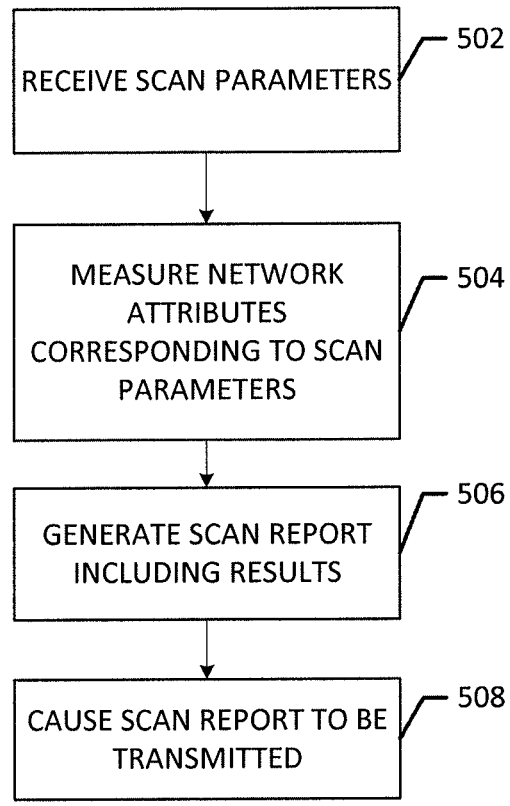
Figure 6:
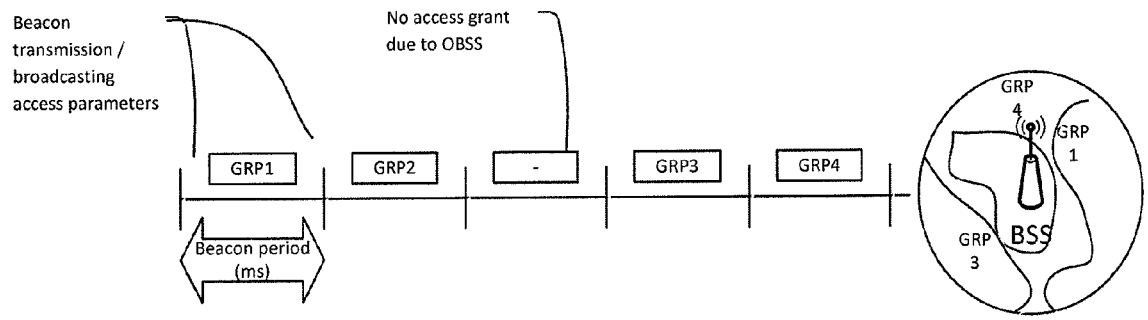
Figure 7:
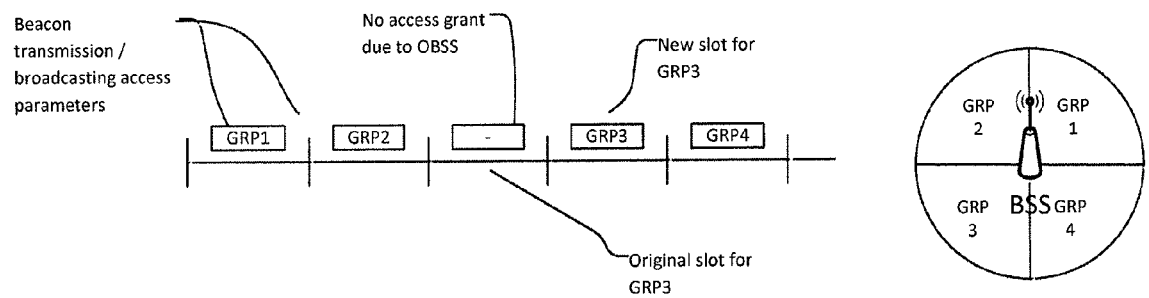
Figure 8:
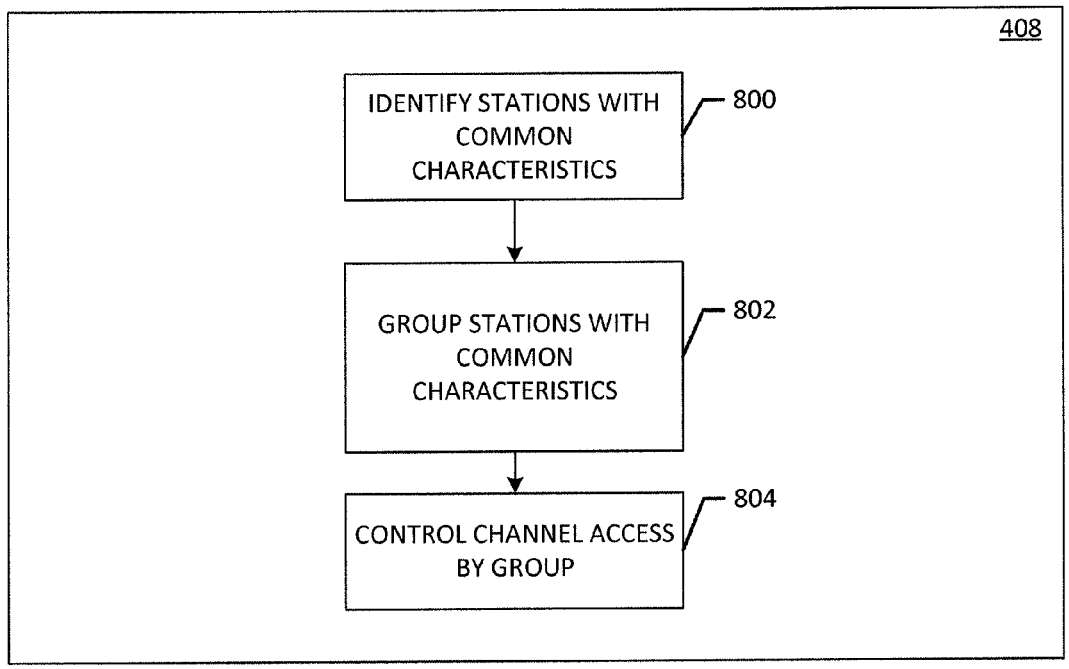
Figure 9:
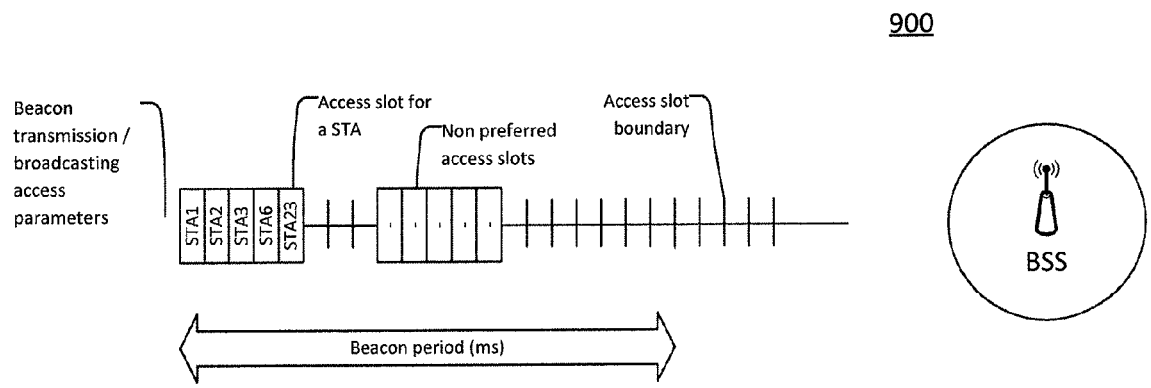
Figure 10:
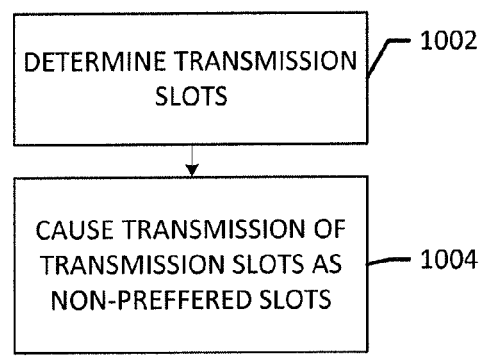

Having thus described certain embodiments of the invention in general terms, reference will now be made to the accompanying drawings, which are not necessarily drawn to scale, and wherein:

FIG. 1 is a schematic diagram of an example network topology featuring two overlapping networks in accordance with an example embodiment of the present invention;

FIG. 2 is a block diagram illustrating an example apparatus for determining channel access parameters, specifically configured in accordance with an example embodiment of the present invention;

FIG. 3 is a block diagram depicting an example apparatus for receiving channel access parameters, specifically configured in accordance with an example embodiment of the present invention;

FIG. 4 is a flow diagram depicting an example of a method for determining channel access parameters using a configurable scan request message in accordance with an example embodiment of the present invention;

FIG. 5 is a flow diagram depicting an example of a method for processing a configurable scan request message in accordance with an example embodiment of the present invention;

FIG. 6 is a representational diagram depicting an example of controlling channel access by grouping wireless stations in accordance with an example embodiment of the present invention;

FIG. 7 is a representational diagram depicting an example of controlling channel access across location groups in accordance with an example embodiment of the present invention;

FIG. 8 is a flow diagram depicting an example of a method for determining channel access parameters based on received scan results in accordance with an example embodiment of the present invention;

FIG. 9 is a representational diagram depicting an example of a process 900 for determining channel access via time divided slotted access in response to received scan results in accordance with an example embodiment of the present invention; and FIG. 10 is a flow diagram depicting a method for determining channel access via time divided slotted access in response to received scan results in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, a wireless transmitter, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order provide improved channel parameters selection in a wireless network. In this regard, a method, apparatus and computer program product of an example embodiment may determine one or more scan parameters for a channel scan, such as an Overlapping Basic Service Set (OBSS) message. The determined parameters may be communicated to one or more network devices, and the network devices may collect data describing the network in accordance with the determined parameters. A scan report containing information specified by the determined parameters may be provided by one or more of the network devices, and an access point may utilize the scan report to determine channel access parameters for the wireless network.

FIG. 1 depicts a schematic representation of an example network topology 100 featuring a first network access point 102 and a second network access point 106. The coverage area 104 of the first network access point 102 overlaps with the coverage area 108 of the second network access point 106. The access points 102 and 106 may communicate with a number of network devices, such as the network device 110, 112, 114, and 116. Each of the network devices may be associated with a particular network access point. For example, the devices 110, 112 may be associated with the first network access point 102, and the devices 114, 116 may be associated with the second network access point 106. An access point and associated devices that form a wireless local area network are known in the 802.11 specification as a "basic service set" or BSS. In particular, embodiments of the invention may be used to facilitate networking in the 802.11ah protocol, or other similar "low power" protocols. Although this terminology is used with respect to 802.11 networks for ease of reference, the same techniques might also be applied to any other network protocol that performs channel arbitration among overlapping networks.

In the present example, three of the example wireless stations 110, 112, 114 are located within an overlapping coverage area of both access points 102, 106. As such, these devices must share communication channels not only with other devices that are members of their BSS, but also devices on the overlapping BSS. This results in what is known as an Overlapping Basic Service Set (OBSS) problem. In order to mitigate interference with overlapping networks, the access points 102, 106 may identify parameters of the overlapping networks to configure channel access parameters. The act of mitigating interference may include determining channel parameters so as to avoid interaction with overlapping networks entirely, reduce the likelihood of interference with overlapping networks, reduce the effect of interference from overlapping networks, or any other channel selection activity to reduce or avoid interference caused by overlapping networks. This data gathering process may be performed by both the access points 102, 106 and the wireless stations 110, 112, 114, 116 coupled to the access points. In order to request data from the wireless stations, the access point may transmit a set of scan parameters to the coupled wireless stations. The data response provided by the wireless stations is known as an OBSS scan report. In order to address the OBSS problem in an efficient manner, example embodiments of the invention provide a method, apparatus, and computer program product for configuring data requested from the wireless stations and received via the OBSS scan report.

The wireless access points 102, 106 may determine particular parameters for the OBSS scan report (see FIG. 4 for example parameters), and notify the wireless stations 110, 112, 114, 116 of the determined parameters. The wireless stations 110, 112, 114, 116 may obtain data corresponding to the determined parameters, and return the data to the access points 102, 106 for processing. The access points 102, 106 may determine channel access parameters based on the data received from the wireless stations 110, 112, 114, 116.

The system of an embodiment of the present invention may include an apparatus 200 as generally described below in conjunction with FIG. 1 for performing one or more of the operations set forth by FIGS. 4-10 and also described below. In this regard, the apparatus 200 may be embodied by a network access point. In this embodiment, the access point may be in communication with a display and/or a data network, either directly, such as via a wireless or wireline connection, or indirectly via one or more intermediate computing devices. In this regard, the display and the access point may be parts of the same system in some embodiments. However, the apparatus 200 may alternatively be embodied by another computing device that is in communication with the access point, such as via a wireless connection, a wireline connection or the like. For example, the apparatus may be a network router, a wireless base station, a wireless signal extender, a device in an ad-hoc wireless network, or any of numerous other hand held or portable communication devices, computation devices, content generation devices, content consumption devices or combinations thereof.

It should also be noted that while FIG. 2 illustrates one example of a configuration of an apparatus 200 for providing improved detection of overlapping networks, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

The access points 102, 106 and wireless stations 110, 112, 114, 116 may be configured in various manners, but, in one embodiment, may be embodied as or otherwise include an apparatus 200 as generically represented by the block diagram of FIG. 2. While the apparatus may be employed, for example, by a wireless access point, base station or the like, it should be noted that the components, devices or elements described below may not be mandatory and thus some may be amended in certain embodiments. Additionally, some embodiments may include further or different components, devices or elements beyond those shown and described herein.

As shown in FIG. 2, the apparatus 200 may include or otherwise be in communication with processing circuitry 202 that is configurable to perform actions in accordance with example embodiments of the access points 102, 106, or wireless stations 110, 112, 114, 116 described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 202 may include a processor 206 and memory 204 that may be in communication with or otherwise control a device interface 208. As such, the processing circuitry may be embodied as a circuit chip (e.g., an integrated circuit chip) configured (e.g., with hardware, software or a combination of hardware and software) to perform operations described herein. However, in some embodiments taken in the context of a wireless access point or wireless station, the processing circuitry may be embodied as a portion of the wireless access point or wireless station.

The device interface 208 may include one or more interface mechanisms for enabling communication with other devices and/or networks. In some cases, the device interface may be any means such as a device or circuitry embodied in either hardware, or a combination of hardware and software that is configured to receive and/or transmit data from/to a network, such as the coverage areas 104, 108 provided by the wireless access points 102, 106, and/or any other device or module in communication with the processing circuitry 202. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 204 may include one or more non-transitory memory devices such as, for example, volatile and/or non-volatile memory that may be either fixed or removable. The memory may be configured to store information, data, applications, instructions or the like for enabling the apparatus 200 to carry out various functions in accordance with example embodiments of the present invention. For example, the memory could be configured to buffer input data for processing by the processor 206. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 206 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 204 or otherwise accessible to the processor. As such, whether configured by hardware or by a combination of hardware and software, the processor may represent an entity (e.g., physically embodied in circuitry—in the form of processing circuitry 202) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As described below, the access points 102, 106 are generally configured to determine scan parameters for identifying overlapping networks, and to determine channel access parameters to avoid network interference from the overlapping networks. Prior to notifying coupled wireless stations of the desired scan parameters, a wireless access point may determine optimal parameters for identification of overlapping networks for the instant network. The access point may thereafter notify the wireless stations of the desired scan parameters, such as via a beacon message or during a handshake process when a new wireless station joins the network.

A wireless station, such as one of the wireless stations 110, 112, 114, 116 may be configured in various manners, but, in one embodiment, may be embodied as or otherwise include an apparatus 300 as generically represented by the block diagram of FIG. 3. While the apparatus 300 may be employed, for example, by a wireless station, such as a wireless antenna, a wireless enabled computer or laptop, a cellular phone, a wireless enabled appliance, a smart phone, or a personal digital assistant, it should be noted that the components, devices or elements described below may not be mandatory and thus some may be amended in certain embodiments. Additionally, some embodiments may include further or different components, devices or elements beyond those shown and described herein.

As shown in FIG. 3, the apparatus 300 may include or otherwise be in communication with processing circuitry 302 that is configurable to perform actions in accordance with example embodiments of the wireless station described herein. The processing circuitry 302 may be configured to perform data processing, application execution and/or other processing and management services according to an example embodiment of the present invention. In some embodiments, the apparatus or the processing circuitry may be embodied as a chip or chip set. In other words, the apparatus 300 or the processing circuitry 302 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 300 or the processing circuitry 302 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 302 may include a processor 306 and memory 304 that may be in communication with or otherwise control a device interface 310 and, in some cases, a user interface 310. As such, the processing circuitry may be embodied as a circuit chip (e.g., an integrated circuit chip) configured (e.g., with hardware, software or a combination of hardware and software) to perform operations described herein. However, in some embodiments taken in the context of a wireless station, the processing circuitry may be embodied as a portion of the wireless station itself.

The user interface 310 (if implemented) may be in communication with the processing circuitry 302 to receive an indication of a user input at the user interface and/or to provide an audible, visual, mechanical or other output to the user. The device interface 310 may include one or more interface mechanisms for enabling communication with other devices, such as other wireless stations via a wireless network. In some cases, the device interface 310 may be any means such as a device or circuitry embodied in either hardware, or a combination of hardware and software that is configured to receive and/or transmit data from/to the network 14 and/or any other device or module, such as other wireless stations, in communication with the processing circuitry 302. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 304 may include one or more non-transitory memory devices such as, for example, volatile and/or non-volatile memory that may be either fixed or removable. The memory may be configured to store information, data, applications, instructions or the like for enabling the apparatus 300 to carry out various functions in accordance with example embodiments of the present invention. For example, the memory could be configured to buffer input data for processing by the processor 306. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 306 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 304 or otherwise accessible to the processor. As such, whether configured by hardware or by a combination of hardware and software, the processor may represent an entity (e.g., physically embodied in circuitry—in the form of processing circuitry 302) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

FIG. 4 is a flow diagram depicting an example of a method 400 for determining channel access parameters using a configurable scan request message in accordance with an example embodiment of the present invention. The method 400 is operable to determine channel access parameters using configurable scan parameters for one or more wireless stations on a wireless network display. Aspects of the method may include determining one or more scan parameters, informing wireless stations of the determined parameters, receiving one or more scan reports containing results corresponding to the scan parameters, and determining channel access parameters using the results. As described above, elements of the method 400 may be performed by an apparatus, such as the apparatus 200 described with respect to FIG. 2. In some embodiments of the invention, the method 400 may be performed a processing means, such as the processing circuitry 202 or the processor 206, and/or a communications means, such as the device interface 208, described with respect to FIG. 2.

At action 402, the method 400 may determine scan parameters for identification of overlapping wireless networks. The scan parameters may correspond to elements of an OBSS scan report structure, such that the parameters notify a wireless station as to what the contents of the OBSS scan report structure should contain. The OBSS parameters may include a variety of information about the channel environment of the network. For example, the OBSS parameters may indicate that any, some, or all of the following information should be provided by a wireless station:

- A number of Service Set Identifiers (SSIDs) detected by a wireless station
- A number of Basic Service Set Identifiers (BSSIDs) detected by a wireless station
- One or more bits indicating an interference level
- A sector/area where the wireless station is located (e.g., if an access point's coverage area is divided into geographical sub-areas)
- A station group identifier
- GPS coordinates of the wireless station
- Coordinates of the wireless station relative to an access point
- Path loss between the wireless station and the access point
- Whether an OBSS message was detected on the same channel by the wireless station
- The contents of an OBSS message detected on the same channel by the wireless station
- A number of other SSIDs or BSSIDs identified by the wireless station
- A name or value of other SSIDs or BSSIDs identified by the wireless station (may be compressed)

The determined scan parameters may also include parameters for the way in which the scan report is transmitted back to the access point. For example, the parameters may include a configuration option to instruct the wireless station to use a specific frame subtype to indicate the presence of an OBSS without providing additional metadata about the OBSS, by sending a frame with a particular subtype (e.g., a data+OBSS indication or control+OBSS indication type sub-frame). A SSID or BSSID may be compressed by transmitting first or last "n" characters of the SSID or BSSID, or by applying a hash function to the SSID or BSSID or a substring of the SSID or BSSID.

The appropriate parameters may be identified based on the type of network or the type of stations active on the network. For example, in scenarios where one or more stations are of a low-power, battery-operated variety, it may be advantageous to minimize the number of requested parameters to reduce data transmission frequency so as to conserve battery power. In networks where the stations are not dependent upon internal batteries, more data may be requested to obtain a clearer picture of the network environment. In some embodiments the parameters may be determined by the processing means, such as by the processing circuitry 202 or the processor 206 as described with respect to FIG. 2.

At action 404, the method 400 may cause the scan parameters to be transmitted to one or more of the wireless stations. The scan parameters may be sent to the wireless stations in a variety of ways. For example, an apparatus, such as the apparatus 200 or the access point 102 may notify a wireless station of the scan parameters at the time the wireless station joins the network provided by the apparatus. Alternatively, the apparatus may periodically transmit a beacon frame containing the scan parameters. As yet another alternative, the apparatus may directly transmit scan parameter data to the wireless station, such as in response to a change to the scan parameters. As a yet further alternative, the apparatus may indicate that the network utilizes a configurable set of OBSS scan parameters in a beacon frame or during the network join process, and a separate message may include the scan parameters. In some embodiments the processing means and/or the communications means may cause the parameters to be transmitted. For example, the processing means, such as the processing circuitry 202 or the processor 206, or the communications means, such as the device interface 208, as described with respect to FIG. 2, may cause the parameters to be transmitted via wireless circuitry coupled to the processing circuitry 202 or processor 206.

At action 406, a scan report with results corresponding to the transmitted scan parameters may be received. For example, an access point may receive scan reports from one or more wireless stations coupled to the same network, and the scan reports may contain data corresponding to the previously transmitted scan parameters. For example, if the access point had requested that scan reports contain the location of the wireless station, the received scan report should include the location of the wireless device. In some embodiments the processing means and/or the communications means may receive the scan report data. For example, the processing means, such as the processing circuitry 202 or the processor 206 as described with respect to FIG. 2 may receive the scan report data from the communications means, such as the device interface 208 including, for example, an antenna or other wireless circuitry coupled to the processing circuitry 202, processor 206, or directly from the wireless station.

At action 408, channel access parameters may be determined using the results received at action 406. As described above, the access point may utilize the results of the scan report to identify one or more overlapping networks in the channel space inhabited by the access point and/or one or more of the wireless stations. The access point may instruction one or more of the wireless stations to take remedial action to avoid interference from the overlapping network or networks. Examples of such remedial measures may include, but are not limited to, selecting an alternative communication channel for communicating with the wireless stations or altering time scheduling so as not to interfere with the overlapping network. Examples of such possible remedial measures are described in further detail below (see FIGS. 6-11). In some embodiments the processing means may determine the channel access parameters using the results. For example, the processing circuitry 202 or the processor 206 as described with respect to FIG. 2 may identify appropriate remedial measures for wireless stations on the network based on results contained with a received scan report.

FIG. 5 is a flow diagram depicting an example of a method 500 for processing a configurable scan request message in accordance with an example embodiment of the present invention. The method 500 is operable to receive a set of scan parameters, generate a scan report according to those parameters, and to cause the generated scan report to be transmitted such that the scan report may be used to determine channel access parameters for devices on a network. The method 500 may be performed by wireless stations, such as the wireless stations 110, 112, 114, 116 described with respect to FIG. 1, in response to receipt of particular scan parameters received from a wireless access point, such as the wireless access points 102, 106 described with respect to FIG. 1. In some embodiments of the invention, elements of the method 500 may be performed by an apparatus, such as the apparatus 300 described with respect to FIG. 3. In some embodiments of the invention, the method 500 may be performed by a processing means, such as the processing circuitry 302 or the processor 306, and or a communications means, such as the device interface 310, described with respect to FIG. 3.

At action 502, scan parameters are received. As described above (see FIG. 4), the scan parameters may include one or more parameters for construction of a message to be utilized for identification of overlapping networks, such as an OBSS scan report message. In some embodiments the processing means may receive the scan parameters, such as via communications means, such as a device interface 310 including, for example, an antenna or wireless circuitry coupled to the processing means. For example, the processing circuitry 302 or the processor 306 and/or the device interface 310 as described with respect to FIG. 3 may receive the scan parameters.

At action 504, network attributes that correspond to the scan parameters are measured. For example, if the scan parameters indicate that a scan report should include an identifier for each SSID or BSSID visible by the wireless station, the wireless station may identify each of the visible SSIDs or BSSIDs. If the scan parameters indicate that scan report should include an interference level, the wireless station may measure the amount of interference. If the scan parameters indicate that the scan report should include a location of the wireless station, the wireless station may determine its current location, such as by receiving location information from a global positioning system (GPS) receiver.

In some embodiment of the invention, the wireless station may store such data locally prior to receiving the scan parameters, so that scan actions need not be performed in response to receiving the scan parameters. For example, the wireless station may keep a record of all SSIDs or BSSIDs seen by the wireless station, obviating the need to scan for SSIDs or BSSIDs in response to receiving the parameters.

The wireless station may also monitor for other data, such as OBSS messages (e.g., messages of other BSSs that it hears) or scan parameters received from other networks. The wireless station may detect such messages on the same channel by reading a frame control subfield (e.g., to/from a distribution system) and comparing a MAC address (e.g., a transmit or receive address) of the frame with a known MAC address of the access point to which it is currently associated. In the case that a MAC frame is transmitted by the AP (e.g., from a distribution system) the wireless station may compare the transmit address of the MAC header to the MAC address of the access point to which the wireless device is connected. In the case that the MAC frame is transmitted by a wireless station (to distribution system) the wireless station may compare the receiver address to the MAC address of the access point to which the wireless device is connected.

In some embodiments the processing means may measure the network attributes. For example, the processing circuitry 302 or the processor 306 as described with respect to FIG. 3 may analyze network data received from an antenna or wireless circuitry to determine the network attributes indicated in the scan parameters.

At action 506, a scan report is generated including the results of the network attribute scan performed at action 504. For example, a wireless station may generate a message comprising a result for each of the scan parameters received at action 502. The scan report may be generated by the processing means, as described above. For example, the processing circuitry 302 or the processor 306 as described with respect to FIG. 3 may aggregate and process the data acquired at action 504 to create a message suitable for transmission to a wireless access point.

At action 508, the scan report is caused to be transmitted. For example, a processor coupled to a wireless station may instruct an antenna or wireless circuitry to send the generated scan report to an access point so that the scan report may be used by the access point to determine channel parameters for the wireless network. The scan report may be caused to be transmitted by the processing means and/or the communications means, as described above. For example, the processing circuitry 302 or the processor 306 as described with respect to FIG. 3 may instruct communications means, such a device interface 310 including, for example, an antenna or wireless circuitry, to transmit the scan report.

FIG. 6 is a representational diagram depicting an example of a process 600 for controlling channel access by grouping wireless stations in accordance with an example embodiment of the present invention. In some embodiments, the access point may group wireless stations into groups that are associated with particular network attributes. For example, wireless stations may be grouped together based on their location or from which networks they receive interference. Once the stations are assigned to particular groups, the stations may further monitor interference in their own groups or, in some cases, interference experienced by different groups different groups and report this information to the access point via scan reports. Grouping of wireless stations may depend upon a particular interference level. For example, if a wireless station receives interference from more than one overlapping network, the grouping may be performed based on, for example, a weighted average of the interferences received from each overlapping network. Wireless stations may also be assigned to a given group based on all of the stations in the group receiving the most interference from a particular overlapping network. That particular group of wireless stations may thus be allowed access to the communication channel at a time when interference is minimal from the particular overlapping network.

The process 600 depicts access point control of channel access for four groups of wireless stations, GRP1, GRP2, GRP3, and GRP4. As described in the process 600, the access point may choose to prevent access to the channel during a specific beacon period or another predefined time interval. The access point may choose to affirmatively not grant access during the beacon period between GRP2 and GRP3.

FIG. 7 is a representational diagram depicting an example of a method 700 for controlling channel access across location groups in accordance with an example embodiment of the present invention. The process 700 depicts 4 groups of wireless stations grouped by location (e.g., four quadrants around the access point labeled BSS). The process 700 describes how channel access parameters may be modified for groups in response to detection of overlapping networks. In the process 700, the channel access period for GRP3 is modified to avoid a period during which access would interfere with an overlapping network.

FIG. 8 is a flow diagram depicting a specific example of determining of channel access parameters based on received scan results such as described with respect to action 408 of FIG. 4, in accordance with an example embodiment of the present invention. As described above with respect to FIGS. 6 and 7, wireless stations may be separated into groups based on various factors, including the physical location of the wireless station or the networks with may cause interference with the wireless station. The method 408 describes a process for apportioning wireless stations into groups and controlling channel access based on those groups. In some embodiments of the invention, elements of the method 408 may be performed by an apparatus or wireless access point, such as the apparatus 200 described with respect to FIG. 2. In some embodiments of the invention, the method 408 may be performed by a processing means, such as the processor 208 described with respect to FIG. 2.

As described above with respect to FIG. 4, an access point may receive a set of scan results for representing a scan of network attributes for a given wireless network. These results may include attributes received from multiple wireless stations. For example, multiple stations within the network may report the number of networks with which they overlap, the level of network interference they observe, the SSIDs or BSSIDs of overlapping networks, interference levels for particular network SSIDs or BSSIDs, the physical location of the wireless stations, or the like. At action 800, the access point may identify common attributes in the scan data received from the wireless stations. For example, the access point may identify that 3 stations have interference from the same overlapping network, and 2 different stations have interference from a different overlapping network. In an alternative example, the access point may identify that 4 stations are proximate to one another, and a fifth station is not proximate to any other stations. In some embodiments the processing means may identify the common network attributes such as by using processing circuitry 202 or the processor 206 as described with respect to FIG. 2 to identify correlations across the network parameters.

At action 802, the wireless stations that have been identified as having the same or similar network attributes may be apportioned into groups. Network attributes need not be identical in order for stations to be identified as having common attributes. For example, attributes that are within a given threshold range of one another may be identified as common across stations. The threshold may be dynamically configurable depending upon whether the access point is configured to bias towards including stations in groups. In some embodiments the processing means may apportion the wireless stations into groups, such as by using the processing circuitry 202 or the processor 206 as described with respect to FIG. 2 to separate the wireless stations into groups.

At action 804, channel access parameters are selected for the wireless stations based on their group. As described above with respect to FIGS. 6 and 7, wireless stations within a particular group may be allowed access to the channel simultaneously, or particular groups may be precluded from using the channel at particular times. Channel access parameters may be established via the processing means as described above. For example, an apparatus such as the apparatus 200 may utilize the processing circuitry 202 or the processor 206 as described with respect to FIG. 2 to manage the channel access parameters.

FIG. 9 is a representational diagram depicting an example of a process 900 for determining channel access via time divided slotted access in response to received scan results in accordance with an example embodiment of the present invention. The process 900 depicts a given beacon period divided into a plurality of time divided access slots. Where an access point controls the channels via a slotted access method (e.g., Time Division Multiple Access), the access point may mark certain slots of the beacon period as "non-preferred" to avoid collisions with transmissions from overlapping networks. The access point may use a beacon message to assign access slots at the beginning of the beacon period to particular wireless stations, such as depicted in the process 900. In the same beacon message, the access point may mark other slots as non-preferred to indicate to the stations that the marked beacon slots are likely to result in contention for the channel with an overlapping network.

The use of beacon messages in this manner also allows for adjacent networks to coordinate transmissions so as to avoid contentions. For example, an access point for an adjacent network may listen to the beacon frame for the original network to identify non-preferred slots for the adjacent network.

FIG. 10 is a flow diagram depicting a method 1000 for determining channel access via time divided slotted access in response to received scan results in accordance with an example embodiment of the present invention. As described above with respect to FIG. 9, an access point may identify particular slots in a beacon frame as non-preferred to dissuade wireless stations on the network from transmitting during the non-preferred periods. The method 1000 describes a process for identifying certain slots as non-preferred and controlling the channel access of the wireless stations by transmitting the non-preferred slots to wireless stations as channel access parameters. In some embodiments of the invention, elements of the method 1000 may be performed by an apparatus or wireless access point, such as the apparatus 200 described with respect to FIG. 2. In some embodiments of the invention, the method 1000 may be performed by a processing means, such as the processing circuitry 202 or the processor 208, and/or a communications means, such as the device interface 208, as described with respect to FIG. 2.

At action 1002, transmission slots that may interfere with overlapping networks are determined. For example, the access point may receive scan reports from wireless stations as described above (see FIGS. 4-8), and determine interference patterns using those scan reports. Time slots likely to cause interference may thus be identified and designated as non-preferred slots. In some embodiments of the invention, the access slots may be assigned via access points employing a processing means, such as the processing circuitry 202 or the processor 208 described with respect to FIG. 2.

At action 1004, data describing the transmission slots marked as non-preferred may be transmitted. For example, the access point may cause transmission to one or more wireless stations as a beacon message or via another message. In some embodiments of the invention, data describing the non-preferred access slots may be caused to be transmitted by a processing means, such as the processing circuitry 202 or the processor 208, and/or by a communications means, such as the device interface 208 described with respect to FIG. 2. Upon receipt of the transmitted data, the wireless stations may avoid the non-preferred access slots in order to avoid interference with the overlapping network.

It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus 200 employing an embodiment of the present invention and executed by a processor 206 of the apparatus 200, or a memory 304, of an apparatus 300 employing an embodiment of the present invention and executed by a processor 306. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for operating a wireless network, the method comprising:
   determining one or more scan parameters for identifying a presence of at least one overlapping wireless network, the one or more scan parameters chosen from a subset of a plurality of scan parameters, wherein a number of the one or more scan parameters chosen is based at least on a power supply of a plurality of wireless stations;
   causing the one or more scan parameters to be transmitted to the plurality of wireless stations;
   receiving scan reports from at least some of the plurality of wireless stations, wherein content of the received scan reports comprises results corresponding to the one or more scan parameters;
   based at least in part on the content of the received scan reports, identifying at least two of the plurality of wireless stations as having one or more common characteristics;
   associating the identified at least two wireless stations with a group;
   determining a set of common channel access parameters for the group; and
   causing at least a portion of the set of common channel access parameters to be transmitted to the at least two wireless stations to mitigate interference with the at least one overlapping wireless network.

2. The method of claim 1, further comprising:
   identifying the at least one overlapping wireless network from the scan reports; and
   defining the set of common channel access parameters such that the set of common channel access parameters instruct the at least two wireless stations to avoid interference with the at least one overlapping wireless network.

3. The method of claim 1, wherein the one or more scan parameters comprise at least one access parameter selected from a group consisting of:
   a location of at least one of the plurality wireless stations,
   a number of service set identifiers visible to the at least one of the plurality of wireless stations, and
   an interference level.

4. The method of claim 1, wherein the set of common channel access parameters define a frame subtype for indicating the presence of an overlapping network by using a particular frame type without transmission of additional data identifying the overlapping network.

5. The method of claim 1, wherein the one or more common characteristics are at least one of a common location or a common interference level with a particular overlapping wireless network.

6. The method of claim 1, wherein the one or more common characteristics are a weighted average of all interferences observed by a particular wireless station from the plurality of wireless stations.

7. The method of claim 1, further comprising identifying, from the scan reports, one or more non-preferred access slots that are likely to cause interference with the at least one overlapping network, wherein the common channel access parameters notify the identified at least two wireless stations of the one or more non-preferred access slots.

8. The method of claim 1, wherein the plurality of wireless stations communicate via an 802.11ah protocol.

9. An apparatus comprising at least one processor and at least one memory including computer program instructions, the at least one memory and the computer program instructions configured to, with the at least one processor, cause the apparatus at least to:
   determine one or more scan parameters for identifying a presence of an overlapping wireless network, the one or more scan parameters chosen from a subset of a plurality of scan parameters, wherein a number of the one or more scan parameters chosen is based at least on a power supply of a plurality of wireless stations;
   cause the one or more scan parameters to be transmitted to the plurality of wireless stations;
   receive scan reports from at least some of the plurality of wireless stations, wherein content of the received scan reports comprises results corresponding to the one or more scan parameters;
   based at least in part on the content of the received scan reports, identify at least two of the plurality of wireless stations as having one or more common characteristics;
   associate the identified at least two wireless stations with a group;
   determine a set of common channel access parameters for the group; and
   cause at least a portion of the set of common channel access parameters to be transmitted to the at least two wireless stations to mitigate interference with the at least one overlapping wireless network.

10. The apparatus of claim 9, further comprising program instructions configured to cause the apparatus to:
    identify the at least one overlapping wireless network from the scan reports; and
    define the set of common channel access parameters such that the set of common channel access parameters instruct at least the at least two wireless stations to avoid interference with the at least one overlapping wireless network.

11. The apparatus of claim 9, wherein the one or more scan parameters comprise at least one channel access parameter selected from a group consisting of:
    a location of at least one of the one or more wireless stations,
    a number of service set identifiers visible to the at least one of the one or more wireless stations, and
    an interference level.

12. The apparatus of claim 10, wherein the set of common channel access parameters define a frame subtype for indicating the presence of an overlapping network by using a particular frame type without transmission of additional data identifying the overlapping network.

13. The apparatus of claim 9, wherein the one or more common characteristics are at least one of a common location or a common interference level with a particular overlapping wireless network.

14. The apparatus of claim 9, wherein the one or more common characteristics are a weighted average of all interferences observed by a particular wireless station from the plurality of wireless stations.

15. The apparatus of claim 9, further comprising program instructions configured to cause the apparatus to identify, from the scan reports, one or more non-preferred access slots that are likely to cause interference with the at least one overlapping network, wherein the common channel access parameters notify the identified at least two wireless stations of the one or more non-preferred access slots.

* * * * *